(12) United States Patent
Schwager et al.

(10) Patent No.: US 8,581,607 B2
(45) Date of Patent: Nov. 12, 2013

(54) TESTING DEVICE AND METHOD FOR DETERMINING A COMMON MODE SIGNAL OF AN ELECTRICAL TELECOMMUNICATION

(75) Inventors: Andreas Schwager, Waiblingen (DE); Werner Baeschlin, Oberrohrdorf (CH)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 12/739,536

(22) PCT Filed: Jul. 30, 2008

(86) PCT No.: PCT/EP2008/006288
§ 371 (c)(1),
(2), (4) Date: Apr. 23, 2010

(87) PCT Pub. No.: WO2009/056181
PCT Pub. Date: May 7, 2009

(65) Prior Publication Data
US 2010/0308851 A1 Dec. 9, 2010

(30) Foreign Application Priority Data
Oct. 30, 2007 (EP) .................................... 07021220

(51) Int. Cl.
*G01R 31/00* (2006.01)
(52) U.S. Cl.
USPC ................................................. 324/750.02
(58) Field of Classification Search
None
See application file for complete search history.

(56) References Cited

U.S. PATENT DOCUMENTS 8,013,467 B2 * 9/2011 Young ............................... 307/4

FOREIGN PATENT DOCUMENTS

| JP | 3 289221 | 12/1991 |
|----|----------|---------|
| JP | 4 20126  | 1/1992  |

OTHER PUBLICATIONS

U.S. Appl. No. 13/502,774, filed Jun. 11, 2012, Schwager, et al.
"Specification for radio disturbance and immunity measuring apparatus and methods, Part 1: Radio Disturbance and Immunity Measuring Apparatus", British Standard, International Electrotechnical Commission, Internation Special Committee on Radion Interference, CISPR 16-1, ed. 2.1, pp. 1-230, (1999).
"Information technology equipment—Radio Disturbance Characteristics—Limits and Method of Measurement", International Electrotechnical Commission, Internation Special Committee on Radio Interference, CISPR 22, ed. 5.2, pp. 1-155, (2005).
U.S. Appl. No. 13/058,281, filed Feb. 9, 2011, Schwager, et al.
Office Action issued Nov. 22, 2012, in Chinese Patent Application No. 200880114101.4 with English translation.
The First Office Action issued Jun. 8, 2012 in Chinese Patent Application No. 200880114101.4 (with English translation).

* cited by examiner

*Primary Examiner* — Vinh Nguyen
(74) *Attorney, Agent, or Firm* — Oblon, Spivak, McClelland, Maier & Neustadt, L.L.P.

(57) ABSTRACT

A testing device including: a first terminal configured to be connected to an equipment under test; a common-mode detector configured to detect a common-mode part of a signal emitted from the equipment under test; and a first impedance unit connected in series between the first terminal and the common-mode detector. The first impedance unit is configured to adjust a longitudinal conversion loss of the testing device to a predetermined value. A corresponding method determines a common mode signal of an electrical telecommunication.

5 Claims, 10 Drawing Sheets

TESTING DEVICE AND METHOD FOR DETERMINING A COMMON MODE SIGNAL OF AN ELECTRICAL TELECOMMUNICATION

An embodiment of the invention relates to a testing device. A further embodiment of the invention relates to a method for determining a common mode signal of an electrical telecommunication.

BACKGROUND OF THE INVENTION

Certification of devices transmitting data to a wired network port (WNP) is performed by checking the common mode (CM) current or voltage generated by a device under test (DUT) or converted from an impedance stabilization network (ISN). In the standards dealing with certification of electrical devices, e.g. the CISPR (Comité International Spécial des Pertubations Radioélectriques, International Special Committee on Radio Interference) 16-1 and in CISPR 22 (for Information technology equipment) establish uniform requirements for a radio disturbance level of the device under test (also referred to as "equipment under test (EUT)") to fix limits of disturbance, to describe methods of measurement and to standardize operating conditions and interpretation of results.

Assessment of the current mode (also referred to as "asymmetric mode" or "longitudinal mode") current or voltage disturbances at telecommunication ports for attachment of unscreened balanced pairs shall be performed with the telecommunication port connected by a cable to an ISN; thus the ISN shall define the common mode termination impedance seen by the telecommunication port during the disturbance measurements. The ISN allows normal operation of the EUT, and to this end the ISN is interposed in a signal cable between the EUT and any auxiliary/associated equipment (AE) or load required to exercise the EUT.

For Powerline Communication (PLC) modems a corresponding standard has not been achieved until now.

It is an object of the invention to provide an improved testing device and a method for measuring a common mode signal of an equipment under test, e.g. an electrical device.

The object is solved by a testing device and a method as described herein.

Further embodiments are defined in the dependent claims.

Further details of the invention will become apparent from a consideration of the drawings and ensuing description.

DETAILED DESCRIPTION

In the following, embodiments of the invention are described. It is important to note, that all described embodiments in the following may be combined in any way, i.e. there is no limitation that certain described embodiments may not be combined with others.

Figure 1:
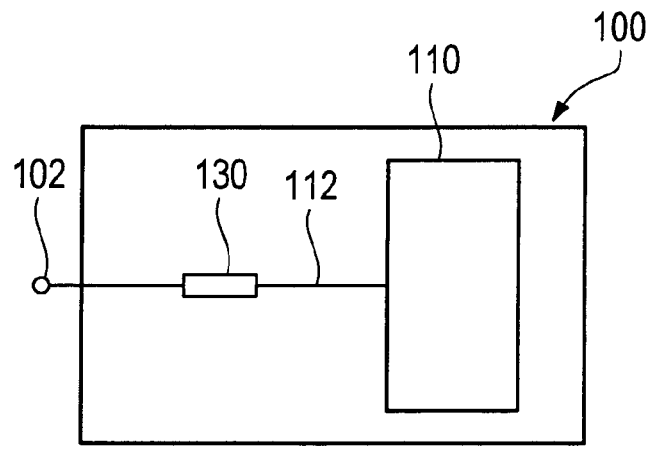
FIG. 1 shows a circuit diagram of a testing device according to an embodiment of the invention.

In FIG. 1 a principle circuit diagram of a testing device 100 is depicted. The testing device 100 comprises a first terminal 102 configured to be connected to an equipment under test (EUT), e.g a telecommunication modem or a Powerline Transmission modem (PLT modem). The equipment under test might also be referred to as device under test (DUT).

Such a testing device might also be referred to as impedance stabilization network (ISN) or Asymmetrical Artificial Network (AAN).

The testing device 100 comprises a common-mode detector 110, which is connected to the first terminal 102. The common-mode detector 110 detects a common-mode part of a signal that is input via said first terminal 102.

Since the testing device 100, due to inherent asymmetries, always converts some power of a differential mode signal at its inputs into a common mode signal (longitudinal conversion loss: LCL) the impedance stabilization network comprises a first impedance unit 130 configured to adjust the longitudinal conversion loss to a predefined value. The first impedance unit might be realized, e.g. as a resistor or as an unbalanced network that comprises a plurality of components.

The first impedance unit 130 is connected in series between the first terminal 102 and the common mode detector 110.

Figure 2A:
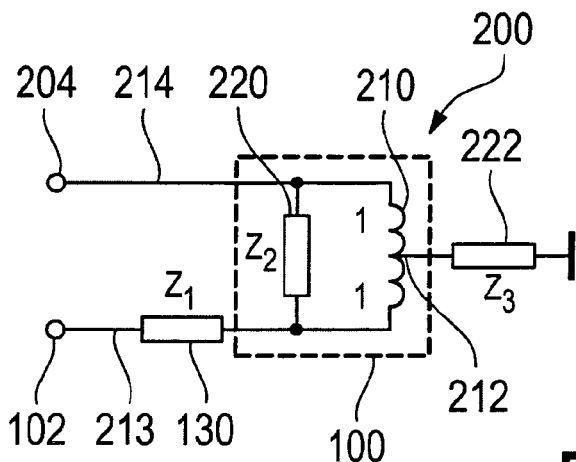
FIG. 2a shows a circuit diagram of a testing device according to a further embodiment of the invention.

In FIG. 2a a further embodiment of a testing device 200 is depicted. Within this embodiment the common-mode detector 110 includes a transformer 210 with a center-tapped terminal 212. The common-mode detector is connected with the first terminal 102 via a first line 213 and with a second terminal 204 via a second line 214. The first impedance unit 130 is connected in series between said first terminal 102 and the common-mode detector 110. The common-mode detector 110 further includes a differential mode termination impedance 220.

The testing device 200 further comprises a common-mode termination impedance 222 that is connected between an output 220 of the common-mode detector 110 and ground. The common-mode termination impedance 222 is used to ensure a predefined termination impedance for the common-mode signal.

The design equations of the circuit of FIG. 2 are:

$$Z_1 = a * Z_T$$

$$Z_2 = Z_T * (1-a)$$

$$Z_3 = Z_L - a * Z_2/4$$

$$Z_T = Z_1 + Z_2$$

$$1/a = 1 + Z_2/Z_1$$

$$Z_L = Z_3 + a * Z_2/4$$

$$LCL = 20\log[2/a*(Z_{LCL}/4+Z_L)*(Y_{LCL}+Y_T)+a/2]$$

$$\approx 20\log[2/a*(Z_{LCL}/4+Z_L)*(Y_{LCL}+Y_T)]$$

with: a: asymmetry factor, $Z_L$: impedance of longitudinal mode, $Z_T$: impedance of transversal mode, LCL: longitudinal conversion loss, $Z_{LCL}$: impedance as seen from equipment under test, $Z_1$: impedance of first impedance unit 130, $Z_2$: impedance of differential mode termination impedance 220, $Z_3$: impedance of common mode termination impedance 222. $Y_{LCL}$: admittance as seen from equipment under test, $Y_T$: admittance of transversal mode. The admittance is the reciprocal of the impedance.

The common mode current $I_C$ in accordance with CISPR 22 can be measured with a current clamp embracing the two conductors on the left side (EUT side).

Figure 2B:
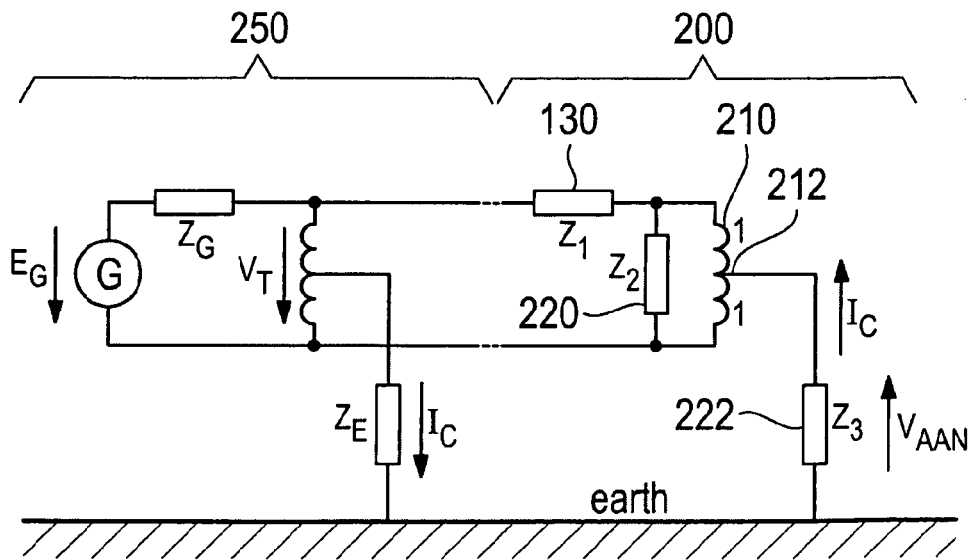
FIG. 2b shows a circuit diagram of a testing device according to a further embodiment together with an equipment under test.

In FIG. 2b a circuit diagram of the testing device 200 connected to a modem 250 is depicted. The equivalent circuit of the modem 250 comprises a current generator G and a generator impedance $Z_G$.

The voltage across $Z_3$ fulfills the condition $V_{RX}=k*Z_L*I_C$. In case the voltage division factor k is appropriately chosen, there is no inconsistency with the common mode current measurement with a current clamp in accordance with the CISPR 22 test set-up. In FIG. 2b no current splitting occurs. The common mode current $I_C$ depends on the longitudinal conversion loss LCL of the impedance stabilization network, the asymmetry of the equipment under test EUT, if any, and the common mode impedance $Z_E$ of the equipment under test.

Figure 3:
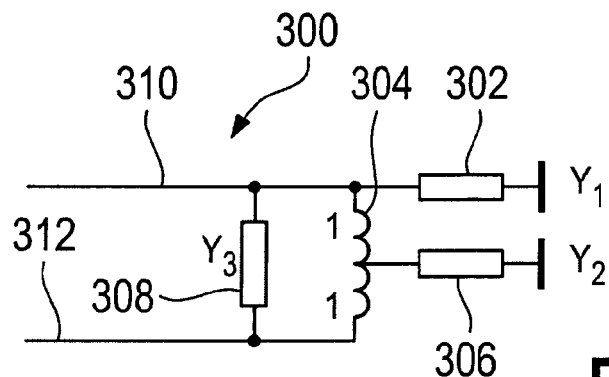
FIG. 3 shows a circuit diagram of a testing device according to a comparative example.

In FIG. 3 a principle circuit diagram of a testing device 300 according to a comparative example is depicted. The testing device 300 comprises a further impedance unit 302, which is connected as a shunt between ground and a terminal of a further transformer 304. Between a center-tapped terminal of the transformer 304 and ground a common mode termination impedance 306 is connected. The transformer 304 is connected between a first line 310 and a second line 312. A differential mode termination impedance 308 is connected in parallel to the transformer 304.

The design equations of the circuit of FIG. 3 are:

$$Y_1 = a * Y_L$$

$$Y_2 = Y_1 * (1-a)$$

$$Y_3 = Y_T - a * Y_2/4$$

$$Y_L = Y_1 + Y_2$$

$$1/a = 1 + Y_2/Y_1$$

$$Y_T = Y_3 + a * Y_2/4$$

$$LCL = 20\log[2/a*(Z_{LCL}/4+Z_L)*(Y_{LCL}+Y_T)+a/2]$$

$$\approx 20\log[2/a*(Z_{LCL}/4+Z_L)*(Y_{LCL}+Y_T)],$$

with: a: asymmetry factor, $Y_L$: admittance of longitudinal mode, $Y_T$: admittance of transversal mode, LCL: longitudinal conversion loss, $Y_{LCL}$: admittance as seen from equipment under test, $Y_1$: impedance of further impedance 302, $Y_3$: admittance of differential mode termination impedance 308, $Z_2$: admittance of common mode termination impedance 306. $Z_{LCL}$: impedance as seen from equipment under test. The admittance is the reciprocal of the impedance.

The common mode current $I_C$ in accordance with CISPR 22 may be measured with a current clamp embracing the two lines 310, 312 on the left side of FIG. 3, which is the side of the equipment under test. The voltage $V_2$ measured across the resistor 306 with the admittance $Y_2$ is neither equal nor proportional to the voltage $V_C=I_C*Z_L$. Thus, checking the voltage $V_2$ against the limit values in Tables 3 and 4 of CISPR 22 is inconsistent with the common mode current measurement with the current clamp in accordance with the CISPR 22 test set-up.

Figure 4:
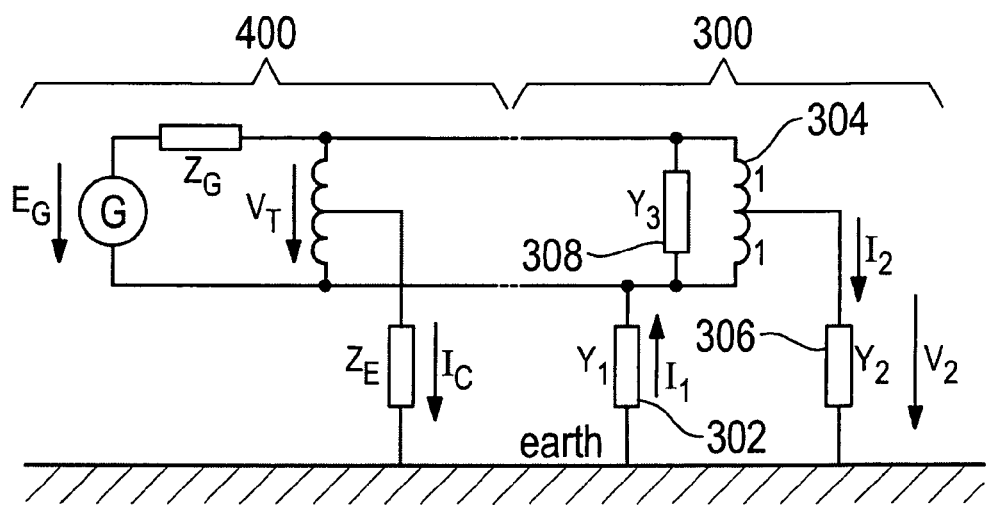
FIG. 4 shows a circuit diagram of a testing device together with an equipment under test according to a comparative example.

In FIG. 4 the current flow is shown for the comparative example, when connecting a device 400 transmitting data (e.g. a Powerline Communication or Powerline Transmission modem) to the testing device 300 according to the principle circuit diagram of FIG. 3. The resistor 302 with the admittance $Y_1$ is a source of an asymmetry. Its current $I_1$ is divided into a common mode current $I_C$ and the current through the resistor 306 with admittance $Y_2$. The two currents (i.e. the common mode current and the current through the resistor with admittance Y2) are identical only in case that the impedance $Z_E$ is equal to $1/Y_2$ (e.g. 25Ω).

Figure 5:
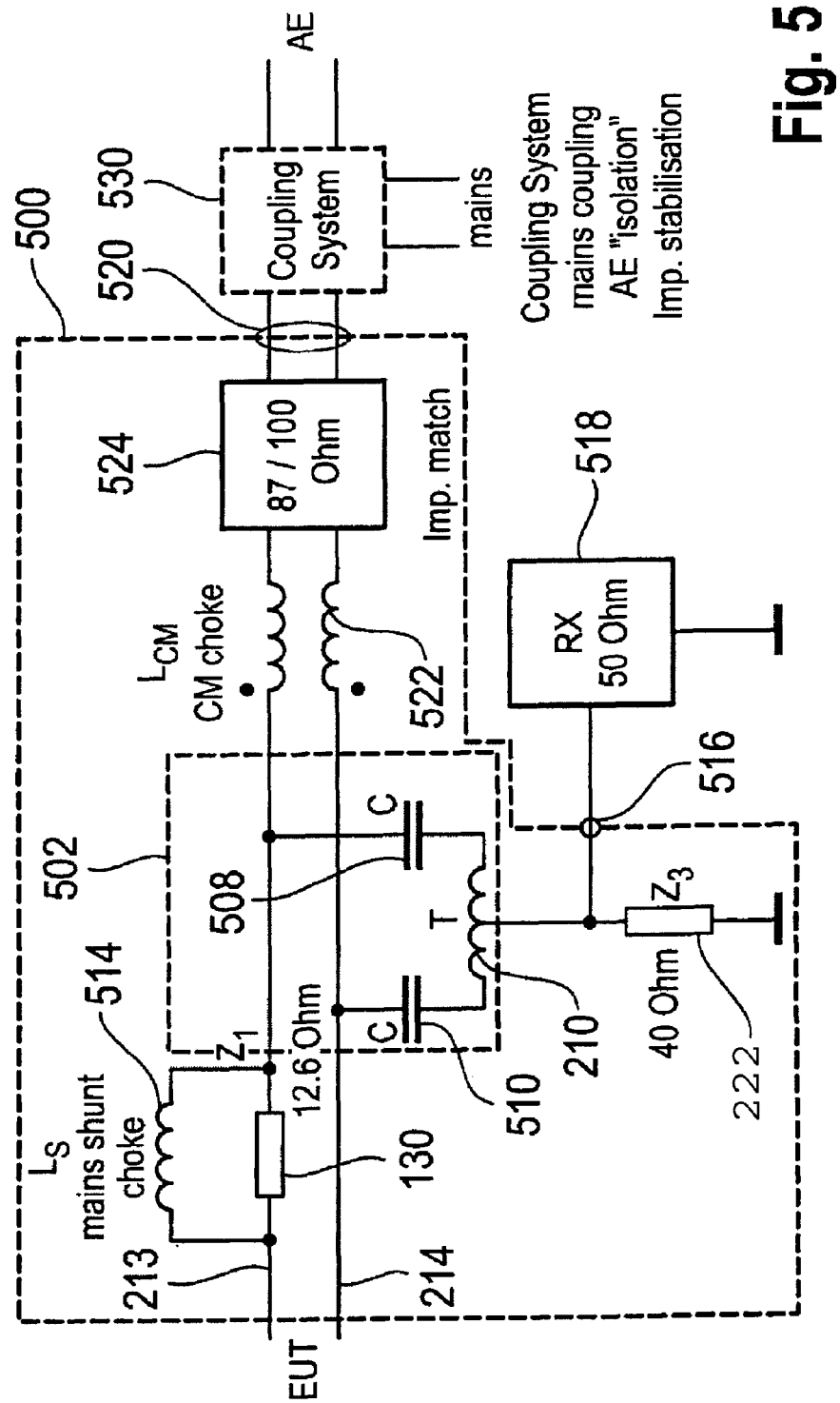
FIG. 5 shows a circuit diagram of a further embodiment of a testing device.

In FIG. 5 a further embodiment of a testing device 500 is depicted. The common mode detector 502 of this testing device 500 includes a first coupling capacitor 508 connected between the first line 212 and the center-tapped transformer 210 and a second coupling capacitor 510 connected between the second line 214 and the other terminal of the transformer 210. A mains shunt choke 514 is connected in parallel to the first impedance unit 130. A measurement port 516 is connected to the center-tapped terminal of the transformer 210 in order to measure the common mode voltage over a measurement resistor 518, Rx.

The testing device 500 comprises a mains-network connection port 520 in order to provide a connection of an equipment under test EUT with an auxiliary equipment, e.g. a communication partner via the testing device 500. Therefore, it is possible to detect a common-mode signal during operation of the equipment under test EUT. The network connection port 520 is connected with the common-mode detector 502 via a common mode choke 522 and an impedance matching unit 524. The common mode choke 522 has a high impedance for the common mode and a low impedance for the differential mode. The impedance matching unit 524 matches the output impedance of the testing device to 100Ω. In case of a first impedance unit 130 equal to 12.6Ω the impedance matching unit 524 has a value of 87Ω in order to provide the resulting output impedance of 100Ω for the differential mode.

A coupling system 530 might be optionally coupled between the network connection port 520 and the auxiliary equipment AE for purposes of mains coupling, isolation of the auxiliary equipment or impedance stabilization.

In case this testing device 500 or impedance stabilization network is used for certification of PLT modems, the mains voltage is supplied to the EUT via the ISN. The current probe, if used, shall be mounted on the cable within 0.1 m distance of the ISN. The insertion impedance of the current probe must be 1Ω maximum.

The ISN (calibrated including any and all adapters required to connect to the EUT, the Coupling System and the AE) has the following properties in the frequency range of 1.605 MHz to 30 MHz:

a) The common mode termination impedance shall be 25Ω±3Ω, phase angle 0°±25°, b) The differential mode termination impedance shall be 100Ω±10Ω phase angle 0°±25°, c) the differential mode transmission loss of the ISN (excluding the Coupling System) shall be $A_{DISN}=20 \log(E0/(2*V_{DISN}))\leq 3$ dB d) The common mode transmission loss of the ISN shall be such that whatever the common mode impedance of the AE, of the mains and of the coupling system, the common mode impedance of the ISN remains within the tolerance defined under pt. a).

e) The longitudinal conversion loss (LCL) of the ISN input (EUT side) shall be 24 dB±1 dB.

f) The attenuation distortion or other deterioration of the signal quality in the wanted signal frequency band caused by the presence of the ISN shall not affect the normal operation of the EUT.

g) If a voltage port on the ISN is available then the accuracy of the voltage division factor shall be within ±1.0 dB of the nominal value (of −1 dB for LCL=24 dB). The voltage division factor is the difference between the voltage appearing across the common mode impedance presented to the EUT by the ISN and the resulting voltage appearing across a receiver input attached to the measuring port of the ISN, expressed in dB.

The values for the electrical elements of the testing device 500 might be as follows: the capacity C of the coupling capacitors 508, 510 might be 0.22 µF, the inductance $L_{CM}$ of the common mode choke 522 might be 100 µH, the inductance $L_S$ of the mains shunt choke 514 might be 22 µH, the inductance T of the transformer 210 might be 330 µH, the first impedance unit $Z_1$ might be 12.6Ω for a common mode impedance $Z_{CM}=25Ω$ and LCL=24 dB.

Figure 6:
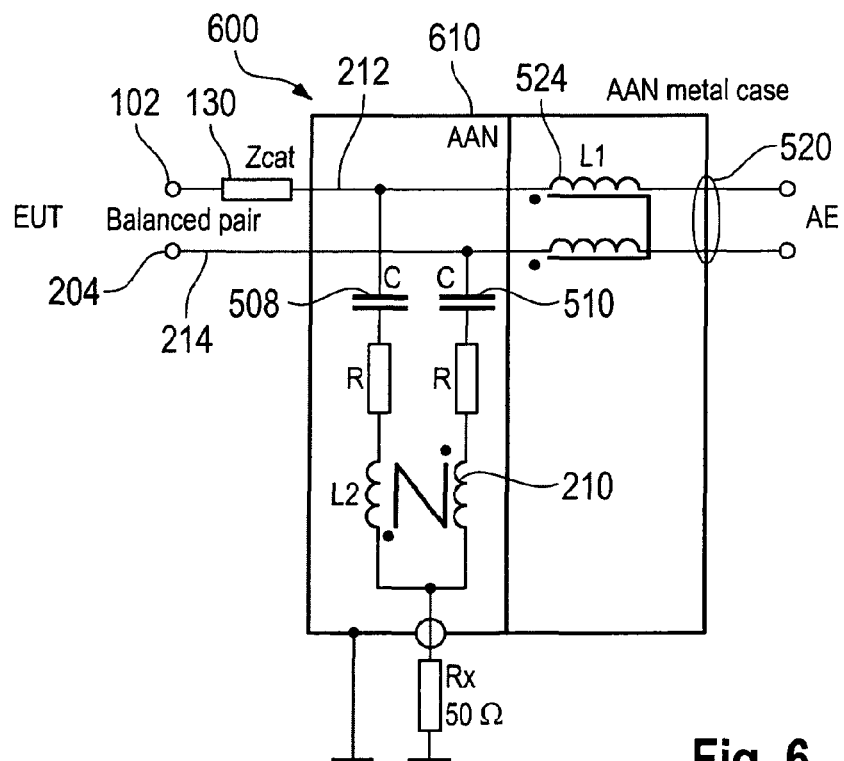
FIG. 6 shows a circuit diagram of still a further embodiment of a testing device.

In FIG. 6 a testing device 600 for use with unscreened single balanced pairs is depicted. At the first terminal 102 and the second terminal 204 an unscreened single balanced pair might be connected. The common mode detector 610 comprises the first coupling capacitor 508 connected to the first line 212 and the second coupling capacitor 510. The common mode choke 524 is connected between the network connection port 520 and the common mode detector 610.

The values of the electrical elements within the testing device 600 might be chosen as follows: The capacity C of the coupling capacitors might be 4.7 µF, the resistance R might be 200Ω, the inductance $L_1$ of the common mode choke might be 2×38 mH, the inductance $L_2$ of the differential mode choke or transformer might be 2×38 mH.

Figure 7:
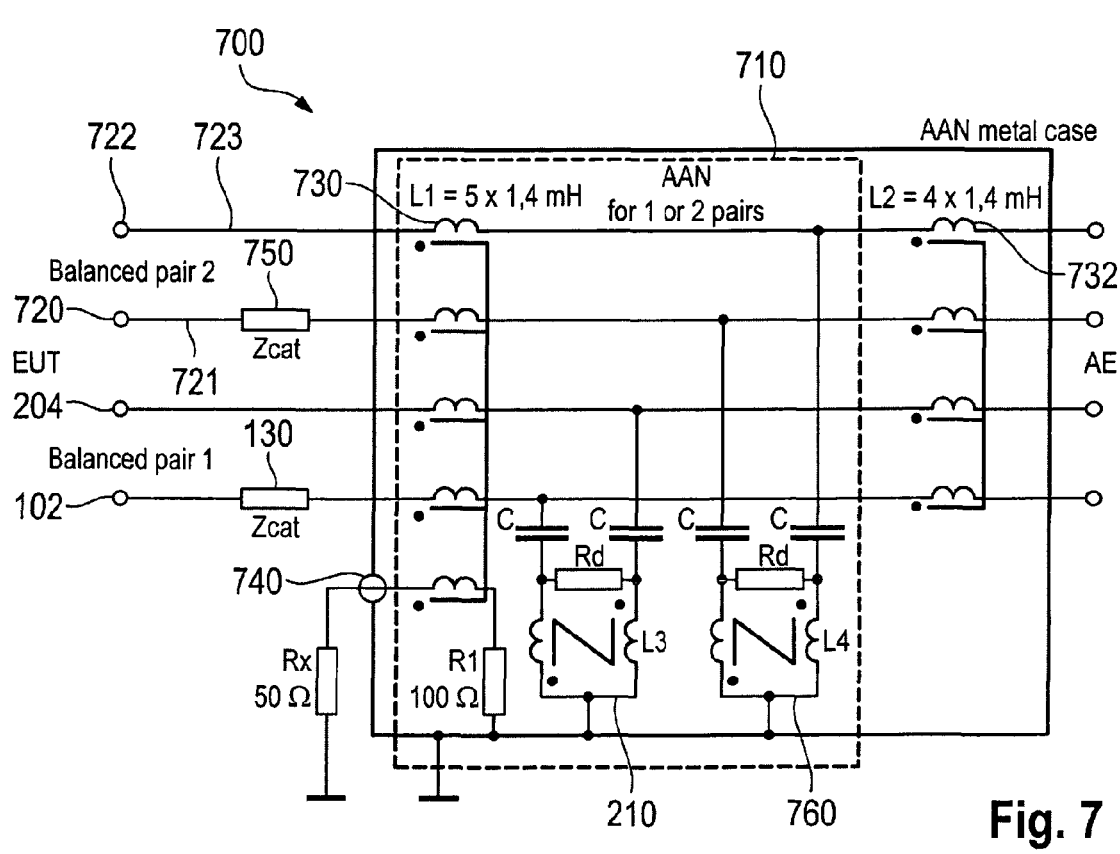
FIG. 7 shows a circuit diagram of a further embodiment of a testing device.

In FIG. 7 a testing device 700 is depicted with a high longitudinal conversion loss (LCL) for use with either one or two unscreened balanced pairs, which comprises a common mode detector 710. A third terminal 720 and a fourth terminal 722 are provided being configured to connect to a second unscreened balanced pair. The testing device 700 can be used to measure common mode disturbances equally well on a single unscreened balanced pair or on two unscreened balanced pairs. The first to fourth terminals 102, 204, 720, 722 are connected to different terminals of a first common mode choke 730, respectively. The first common mode choke 730 is also connected to a measurement port 740. A transformer 210 is connected to the first line 212 and to the second line 214, and a further transformer 760 is connected to the third line 721 and to the third line 723. A second impedance unit 750 is connected in series between the third terminal 720 and the common mode detector 710. The second impedance unit 750 as well as the first impedance unit 130 is used to adjust the longitudinal conversion loss of the testing device 700 to a predefined value. The second impedance unit might be realized, e.g. as a resistor or as an unbalanced network that comprises a plurality of components.

A second common mode choke 732 is connected to output terminal of the first common mode choke 730 in order to prevent any common mode signal from passing to the auxiliary equipment AE.

The values of the electrical elements of the testing device 700 might be as follows: the capacity C of the first and second coupling capacitor might be 82 nF, the inductance L3 of the transformer 210 and the inductance L4 of the second transformer 760 might be 2×3.1 mH, so that these transformers 210, 760 provide a transverse inductance across each pair 4×3.1 mH=12.4 mH. The resistance Rd might be 390Ω.

Figure 8:
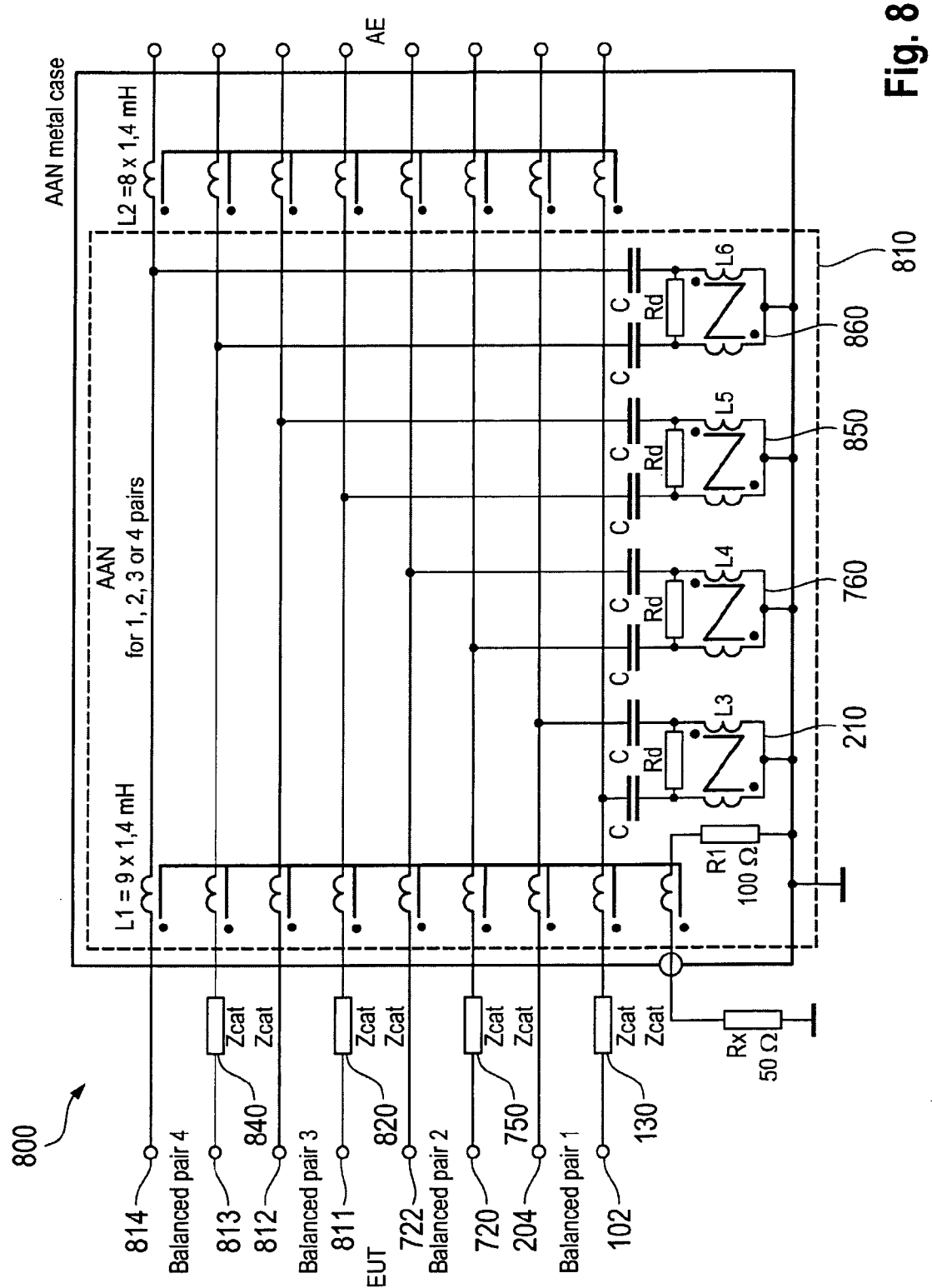
FIG. 8 shows a circuit diagram of a further embodiment of a testing device.

In FIG. 8 a testing device 800 with high longitudinal conversion loss (LCL) with a common mode detector 810 is depicted which might be used with one, two, three or four unscreened balances pairs. For this purpose a fifth, sixth, seventh and eighth terminal 811, 812, 813, 814 are provided. For adjusting the longitudinal conversion loss of the testing device 800, a first impedance unit 130, the second impedance unit 750 and a third impedance unit 820 and a fourth impedance unit 830 are provided. The common-mode detector 810 corresponds to the common-mode detector 710 of FIG. 7 with corresponding further transformers and lines. The values for the electrical elements might be chosen similar as well, e.g. the capacity C of the coupling capacitor might be 82 nF, the resistance Rd might be 390Ω, the inductances of the first transformer 210, the second transformer 760, a third transformer 850, a fourth transformer 860 might be 2×3.1 mH. The third and the fourth impedance units might be realized, e.g. as a resistor or as an unbalanced network that comprises a plurality of components.

Figure 9:
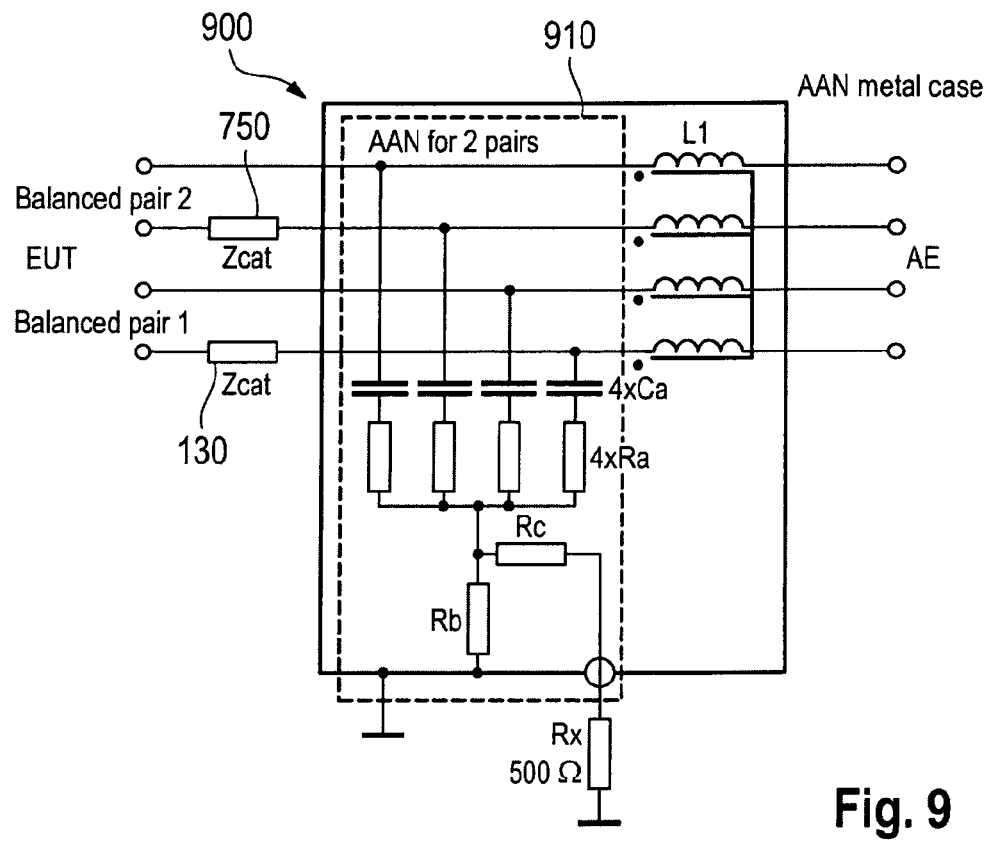
FIG. 9 shows a circuit diagram of a further embodiment of a testing device.

In FIG. 9 a further embodiment of a testing device 900 is depicted with a common-mode detector 910. The testing device 900 includes a 50Ω source matching network at the voltage measuring port, for use with two unscreened balanced pairs. The values for the electrical elements might be for the capacity Ca equal to 33 nF, for the resistance Ra equal to 576Ω, for the resistance Rb equal to 6Ω, for the resistance Rc equal to 44Ω, for the inductance L1 equal to 4×7 mH.

Figure 10:
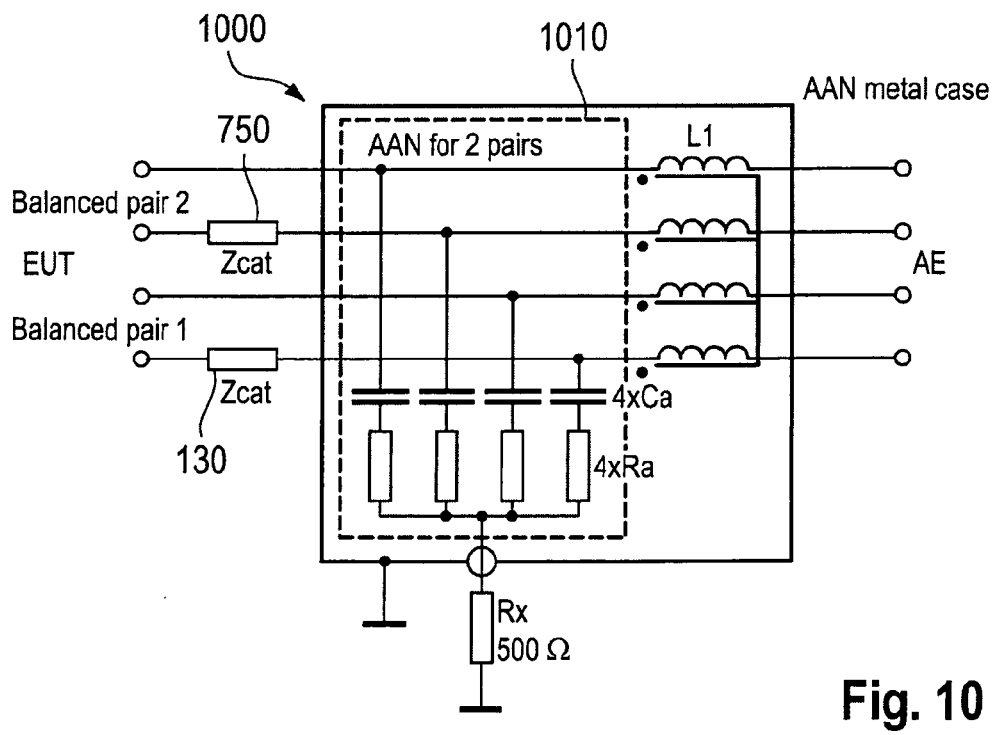
FIG. 10 shows a circuit diagram of a further embodiment of a testing device.

In FIG. 10 a further embodiment of a testing device 1000 with a common-mode detector 1010 is depicted for use with two unscreened balanced pairs.

The values of the electrical elements of the testing device 1000 might be chosen as the capacity Ca equal to 33 nF, the resistance Ra equal to 400Ω, the inductance L1 equal to 4×7 mH.

Figure 11:
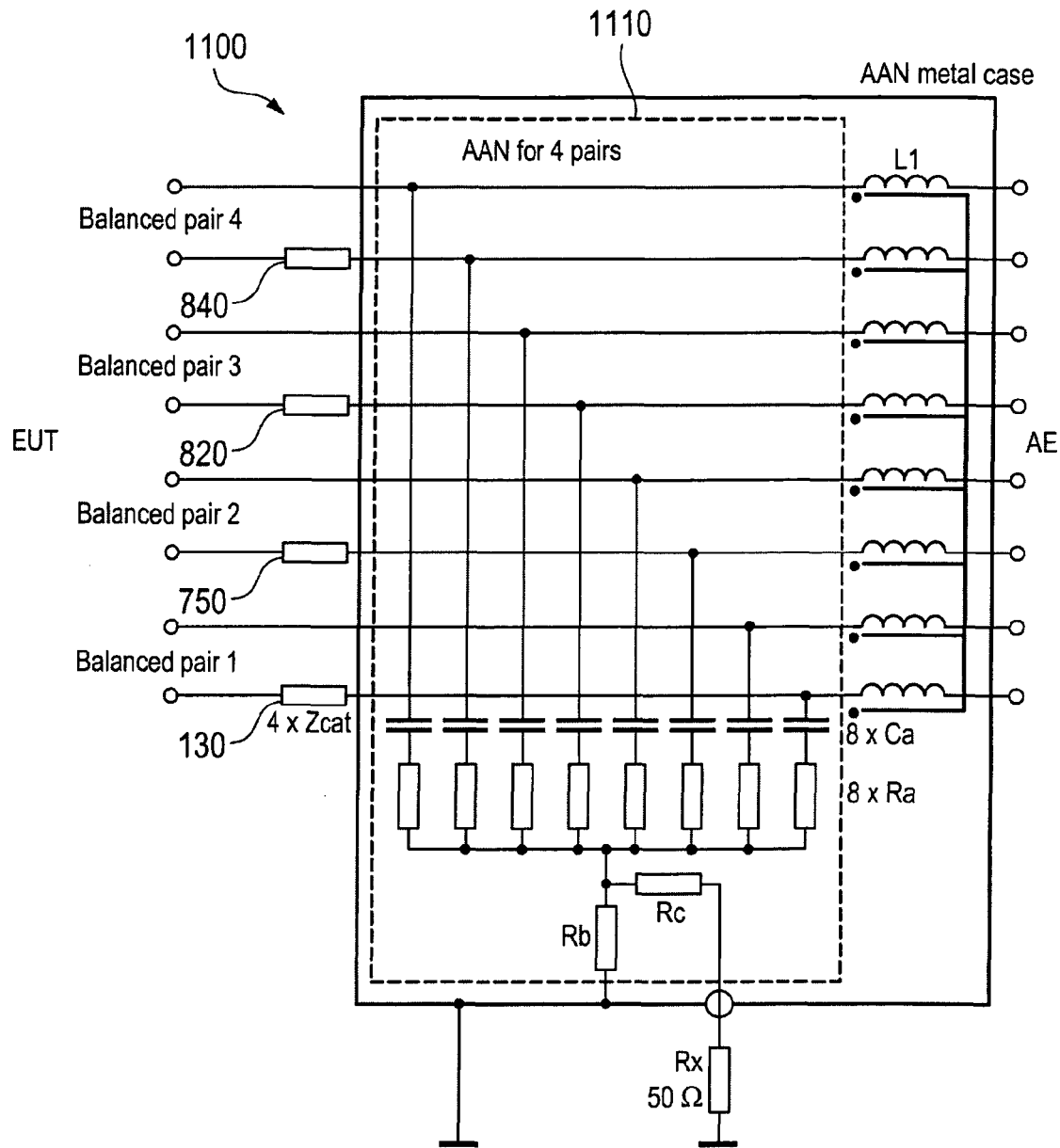
FIG. 11 shows a circuit diagram of a further embodiment of a testing device.

In FIG. 11 a further embodiment of a testing device 1100 with a common mode detector 1110 is depicted, including a 50Ω source matching network at the voltage measuring port, for use with four unscreened balanced pairs. The values for the electrical elements might be chosen as the capacity Ca equal to 33 nF, the resistance Ra equal to 1152Ω, the resistance Rb equal to 6Ω, the resistance Rc equal to 44Ω, the inductance L1 equal to 8×7 mH.

Figure 12:
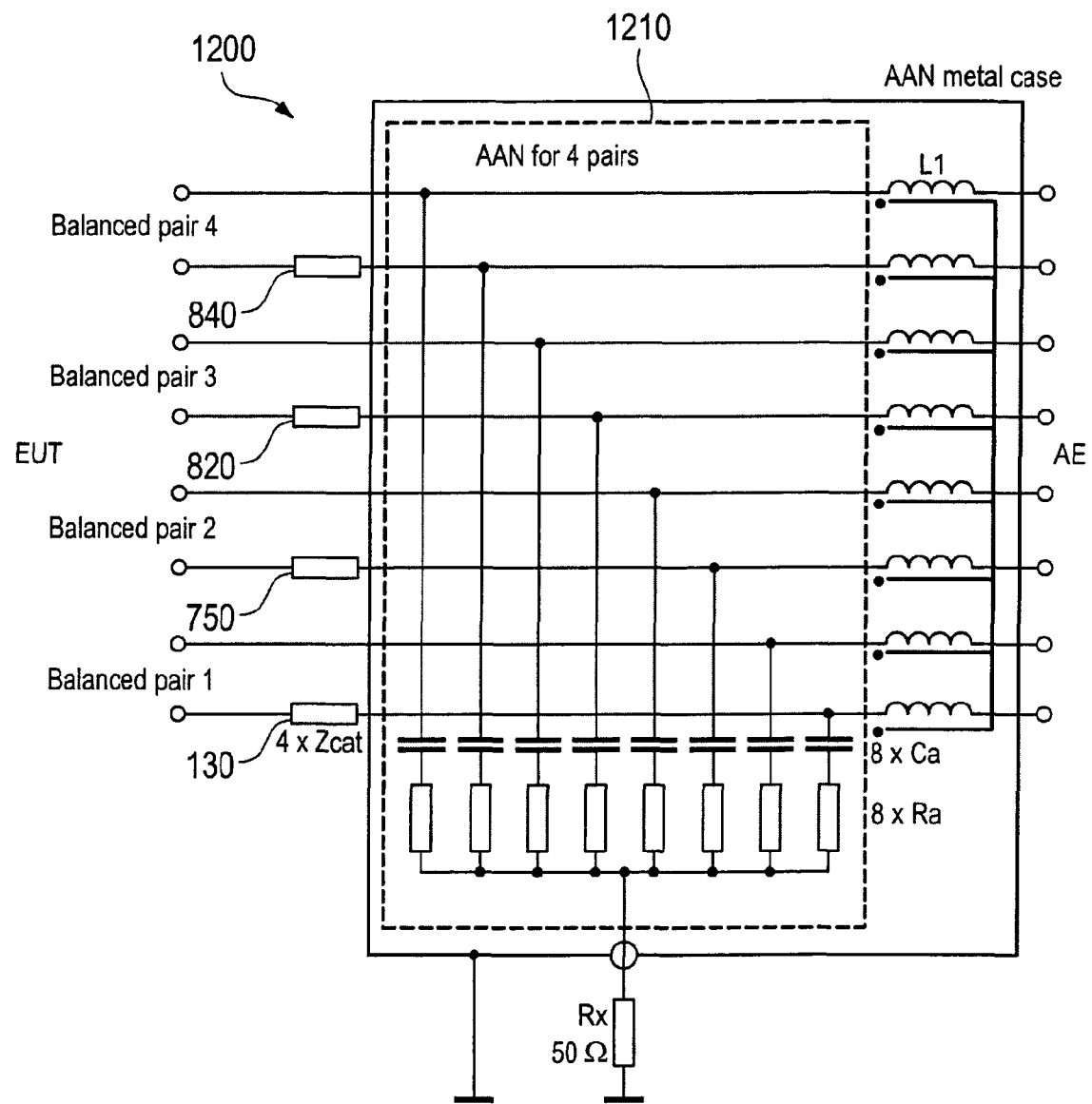
FIG. 12 shows a circuit diagram of a further embodiment of a testing device.

In FIG. 12 a further embodiment of a testing device 1200 with a common mode detector 1210 is depicted for use with four unscreened balanced pairs. The values for the electrical elements might be chosen as the capacity Ca equal to 33 nF, the resistance Ra equal to 800Ω, the inductance L1 equal to 8×7 mH.

Figure 13:
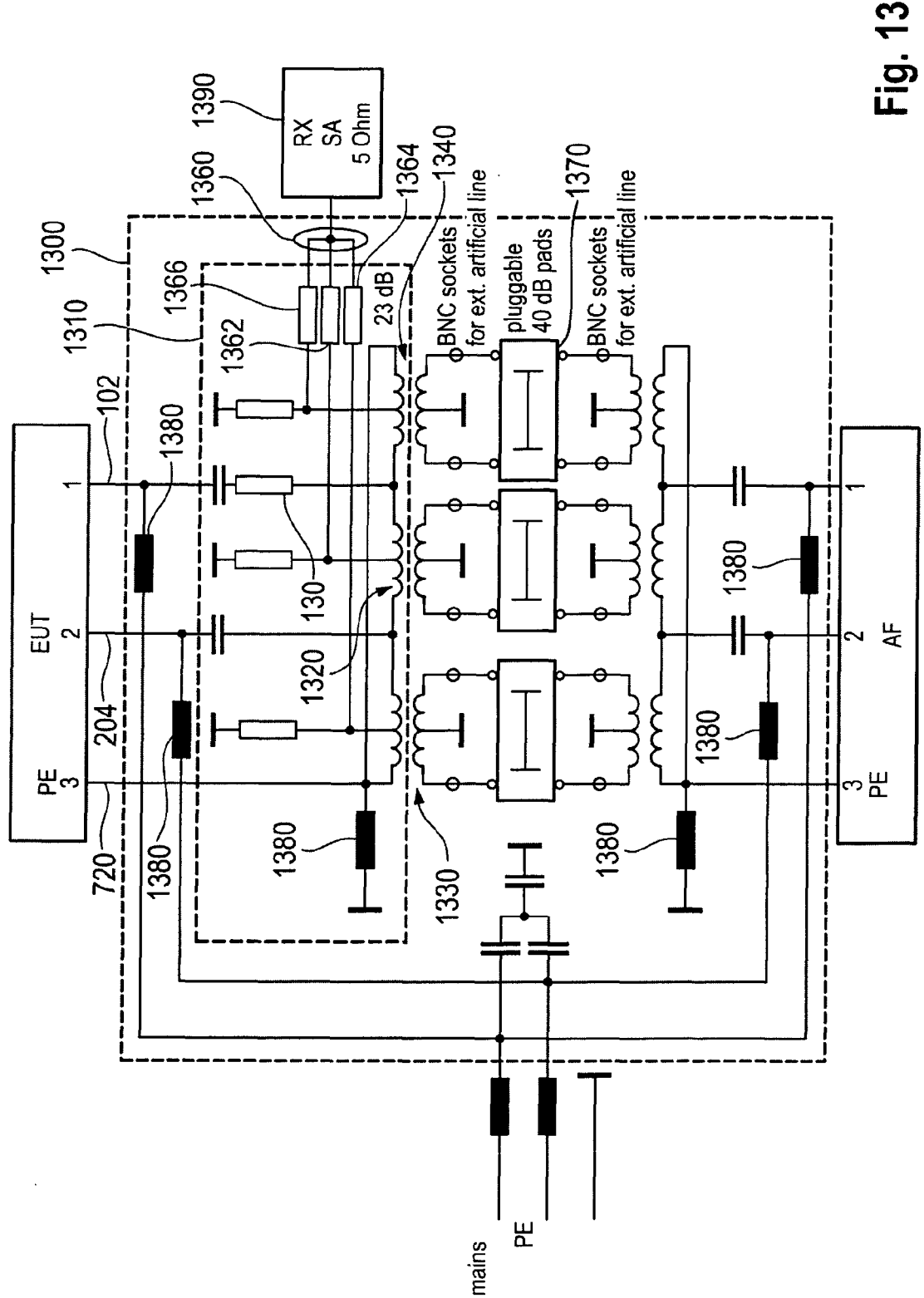
FIG. 13 shows a circuit diagram of a further embodiment of a testing device.

In FIG. 13 a further embodiment of a testing device 1300 with a common mode detector 1310 is depicted. The testing device 1300 can be used to detect a common mode of a Powerline Transmission Modem as equipment under test EUT, which uses three lines, i.e. the phase line, the neutral line and the protective earth line PE for communicating with an Auxiliary Equipment AE, for instance another PLT modem which uses three lines. While using three lines, i.e. the neutral line, the phase line and the protective earth line, a MIMO (multiple input-multiple output)-scheme might be implemented, transmitting and receiving signals on a plurality of combinations between the three available lines. In addition a further communication channel for receiving signals is available by evaluating signals of a common mode.

Within the testing device 1300 a third terminal 720 configured to be connected to said equipment under test is provided, said third terminal being connected to the common-mode detector 1310. The common-mode detector includes a first, a second and a third transformer 1320, 1330, 1340, wherein said first transformer 1320 is connected with the first terminal 102 and the second terminal 204, the second transformer 1330 is connected with the second terminal 204 and the third terminal 720, and the third transformer 1340 is connected with the first terminal 102 and the third terminal 720.

In addition the testing device 1300 comprises a measurement port 1360, wherein said common-mode detector 1310 further includes a first common-mode termination impedance 1362 connected between a center-tapped terminal of said first transformer 1320 and said measurement port 1360, a second common-mode termination impedance 1364 connected between a center-tapped terminal of said second transformer 1330 and said measurement port 1360, and a third common-mode termination impedance 1366 connected between a center-tapped terminal of said third transformer 1340 and said measurement port 1360. The first, second and third common-mode termination impedances 1362, 1364, 1366 form a summation network, which sums up the common-mode signals of the three-wire system due to the first, second and third terminals 102, 204, 720 and deliver the sum via the measurement port 1360 to a connectable measurement equipment, e.g. a spectrum analyzer (SA) 1390.

Further on said first, second and third transformer are connected via their respective secondary side with BNC sockets for an external artificial line. In order to regulate an attenuation of the signals to an auxiliary equipment AE pluggable attenuation units 1370 are provided. The value of the attenuation unit 1370 might be easily changed.

Chokes 1380 are provided as low pass filters in order to pass only signals with low frequency from a mains port to the equipment under test EUT and to the auxiliary equipment AE.

Figure 14:
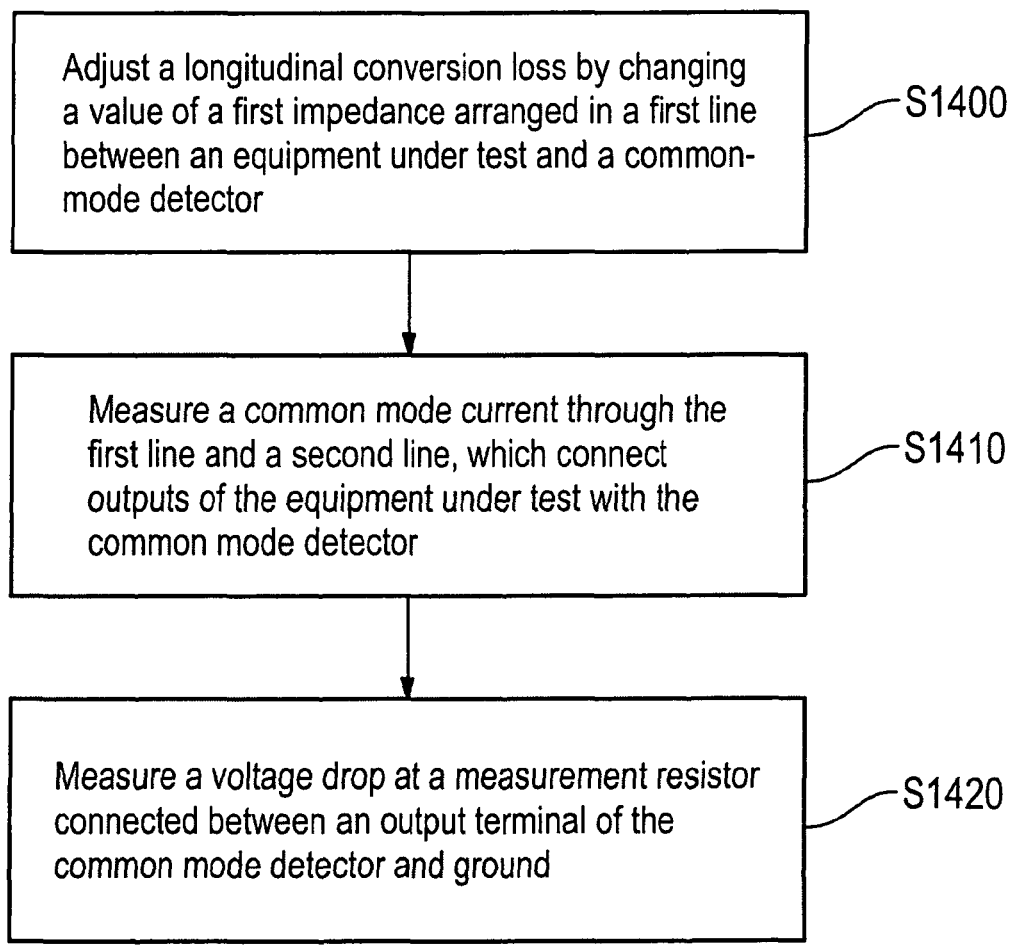
FIG. 14 shows schematically steps for measuring a common mode signal of an electrical device.

In FIG. 14 method steps are depicted for performing a method for determining a common mode signal of an equipment under test.

In a step S1400 a longitudinal conversion loss is adjusted by changing a value of a first impedance unit arranged in series between an equipment under test and a common-mode detector.

In a step S1410 a common-mode current through a first line and a second line, which connect outputs of the equipment under test with the common-mode detector, is measured.

In step S1420 a voltage drop is measured at a measurement resistor connected between a common-mode output terminal and ground.

With the proposed method it is possible to measure a common mode signal more precisely, since the first impedance unit, which is used for adjusting the longitudinal conversion loss, is situated in series. Thus the voltage drop over the measurement resistor is directly related to the common-mode current.

The common-mode current might be measured with a current clamp embracing both the first line and the second line.

The invention claimed is:

1. A testing device comprising:
   a first terminal configured to be connected to an equipment under test;
   a common-mode detector configured to detect a common-mode part of a signal emitted from said equipment under test, the common mode detector including a common-mode output terminal; and
   a common mode termination impedance connected between said common-mode output terminal and ground,
   a first impedance unit connected in series between said first terminal and said common-mode detector, wherein
   said first impedance unit is configured to adjust a longitudinal conversion loss of said testing device to a predetermined value.

2. The testing device according to claim 1, wherein said common-mode detector includes a transformer, wherein said common-mode output terminal is a center-tapped terminal of said transformer.

3. The testing device according to claim 2, further comprising:
   a measurement port connected to said center-tapped terminal.

4. The testing device according to claim 1, further comprising:
   a mains shunt choke connected in parallel to said first impedance unit.

5. The testing device according to claim 1, wherein said common mode termination impedance is equal to 25Ω.

* * * * *